United States Patent
Kawasaki et al.

(10) Patent No.: US 6,890,978 B2
(45) Date of Patent: May 10, 2005

(54) AROMATIC MONOVINYL RESIN COMPOSITION

(75) Inventors: Toshiharu Kawasaki, Yokohama (JP); Takashi Iwamoto, Sodegaura (JP)

(73) Assignee: A&M Styrene Co., Ltd., Tokyo (JP)

( * ) Notice: Subject to any disclaimer, the term of this patent is extended or adjusted under 35 U.S.C. 154(b) by 57 days.

(21) Appl. No.: 10/088,912

(22) PCT Filed: Aug. 6, 2001

(86) PCT No.: PCT/JP01/06743

§ 371 (c)(1),
(2), (4) Date: Jun. 25, 2002

(87) PCT Pub. No.: WO02/12391

PCT Pub. Date: Feb. 14, 2002

(65) Prior Publication Data

US 2003/0008952 A1 Jan. 9, 2003

(30) Foreign Application Priority Data

Aug. 9, 2000 (JP) .......... 2000-241449

(51) Int. Cl.[7] .......... C08K 5/15; C08K 5/34
(52) U.S. Cl. .......... 524/111; 521/55
(58) Field of Search .......... 524/111; 521/55

(56) References Cited

U.S. PATENT DOCUMENTS 4,338,244 A * 7/1982 Hinsken et al. .......... 524/109
5,175,312 A  12/1992 Dubs et al.
5,516,920 A   5/1996 Nesvadba et al.
5,614,572 A   3/1997 Nesvadba et al.

FOREIGN PATENT DOCUMENTS

| DE | 44 32 732 A1 | 3/1995 |
| GB | 2 281 910 A | 3/1995 |
| JP | 5-170825 A | 7/1993 |
| JP | 7-149817 A | 6/1995 |
| JP | 11-80563 A | 3/1999 |
| JP | 2000-7019 A | 1/2000 |
| JP | 2001-181270 A | 7/2001 |

* cited by examiner

Primary Examiner—Kriellion A. Sanders
(74) Attorney, Agent, or Firm—Birch, Stewart, Kolasch & Birch, LLP

(57) ABSTRACT

An aromatic monovinyl resin composition comprising (a) a polymer comprising an aromatic monovinyl monomer and having a weight average molecular weight of 150,000–700,000 and (b) a 3-arylbenzofuranone, the amount of the 3-arylbenzofuranone being 0.006–0.5% by weight based on the weight of the polymer and the residual amount of the aromatic monovinyl monomer in the aromatic monovinyl resin composition being not more than 100 ppm. According to the present invention, it becomes possible to provide an aromatic monovinyl resin composition which is excellent in heat stability, gives molded products of good color tone, develops little odor and is excellent in moldability.

15 Claims, 1 Drawing Sheet

AROMATIC MONOVINYL RESIN COMPOSITION

TECHNICAL FIELD

The present invention relates to an aromatic monovinyl resin composition less in residual amount of aromatic monovinyl monomers and a method for producing the same, and, more particularly, to an aromatic monovinyl resin composition excellent in heat stability at molding and suitable for use as materials directly contacting with foods, etc. Furthermore, the present invention relates to a product comprising an aromatic monovinyl resin composition and having good color tone and appearance and developing less odor.

BACKGROUND ART

Because of their excellent moldability, aromatic monovinyl resins are widely used as materials for electric articles, various industrial materials, materials of miscellaneous goods and containers for foods, packaging materials, etc.

However, as to aromatic vinyl resins, for example, polystyrenes, the resulting products sometimes suffer from the problem of development of odor if amounts of styrene monomers contained in the resins are large. Furthermore, if dimers or trimers of styrene monomers are contained in large amounts in the resins, they cause unfavorable phenomena such as deterioration of heat resistance, and volatilization and retention of them in the mold at injection molding, which are transferred to the resulting molded products or they cause problems such as reduction of productivity due to increase in the number of cleaning of the mold.

As for the odor of products, JP-A-7-149817 and JP-A-7-149818 propose to reduce the odor with use of phenolic heat deterioration inhibitors, but this technique has a defect of inferior color tone of the resulting products. Moreover, for inhibiting the production of dimers and trimers, JP-5-170825 proposes to add phenolic heat deterioration inhibitors at polymerization step or devolatilization step in production of resin, but this method also has the defect of inferior color tone of the resulting products as above.

On the other hand, U.S. Pat. Nos. 4,325,863, 4,338,244 and 5,175,312 propose to stabilize polymers with addition of 3-arylbenzofuranone, but they make no mention of relation between concentration of the aromatic monovinyl monomer and color tone of the resulting products.

Furthermore, if the resins contain large amounts of the aromatic monovinyl monomer, or dimers and trimers thereof, the following problems may be caused in production of non-foamed sheets and foamed sheets.

That is, if the monomer is present in a large amount in production of non-foamed sheets (molding), removal of gas from dice is not smoothly carried out and the gas is locally present, which sometimes causes formation of die lines on the surface of sheets (a phenomenon of occurrence of lines on the surface of the sheets). If the dimer and the trimer are present in large amounts, they condense and stay at the dice part, and are deposited on the surface of the sheet to form contaminants. These phenomena sometimes bring about serious problems such as bad appearance of the products obtained after forming and unsatisfactory printing on the products.

Moreover, if amount of the monomer is large in production of foamed sheets (molding), the monomer is condensed in the mandrel of extruder, especially, in a mass production machine, and the condensed liquid deposits on the surface of the foamed sheet (sagging phenomenon) to cause serious problems such as bad appearance of the products obtained after forming and unsatisfactory printing on the products. Furthermore, if amounts of the dimer and the trimer are large, extension viscosity of the resin lowers, sometimes resulting in narrow molding width due to drawdown at the time of forming and reduction of productivity.

In order to solve these problems, it is desired that amounts of residual low molecular components such as styrene monomer and dimer and trimer thereof are small in the production of resin, and further desired that these low molecular components are not produced owing to the heat decomposition of polystyrene in producing the sheets and forming. The low molecular components can be diminished to some extent by controlling the conditions at the polymerizing step or devolatilizing step in the production of resin. However, for the inhibition of heat decomposition of the resulting products, it is necessary to stabilize the resin by adding a heat deterioration inhibitor, etc.

DISCLOSURE OF INVENTION

As a result of intensive research conducted by the inventors for the solution of the above problems, it has been found that an aromatic monovinyl resin composition having unexpectedly excellent characteristics can be obtained by adding a specific heat deterioration inhibitor at a specific proportion to an aromatic monovinyl polymer having a specific molecular weight and reducing the concentration of aromatic monovinyl monomer to a specific concentration or lower. Thus, the present invention has been accomplished.

That is, the present invention relates to an aromatic monovinyl resin composition comprising (a) a polymer comprising an aromatic monovinyl monomer and having a weight average molecular weight of 150,000–700,000 and (b) a 3-arylbenzofuranone represented by the following formula (I):

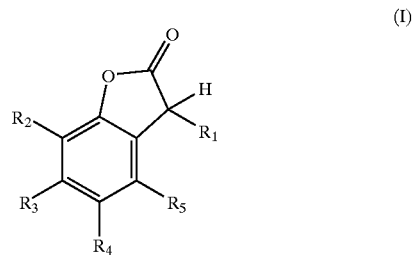

(in the formula, $R_1$ represents a substituted or unsubstituted carbocyclic aromatic group or a substituted or unsubstituted heterocyclic aromatic group and $R_2$, $R_3$, $R_4$ and $R_5$ represent independently a hydrogen atom or an alkyl group of 1–5 carbon atoms), wherein amount of the 3-arylbenzofuranone is 0.006–0.5% by weight based on the weight of the polymer and residual amount of the aromatic monovinyl monomer remaining in the aromatic monovinyl resin composition is not more than 100 ppm.

Furthermore, the present invention relates to a foamed sheet comprising said aromatic monovinyl resin composition and a formed product obtained therefrom.

Moreover, the present invention relates to a non-foamed sheet comprising said aromatic monovinyl resin composition and a formed product obtained therefrom.

BEST MODE FOR CARRYING OUT THE INVENTION

Figure 1:
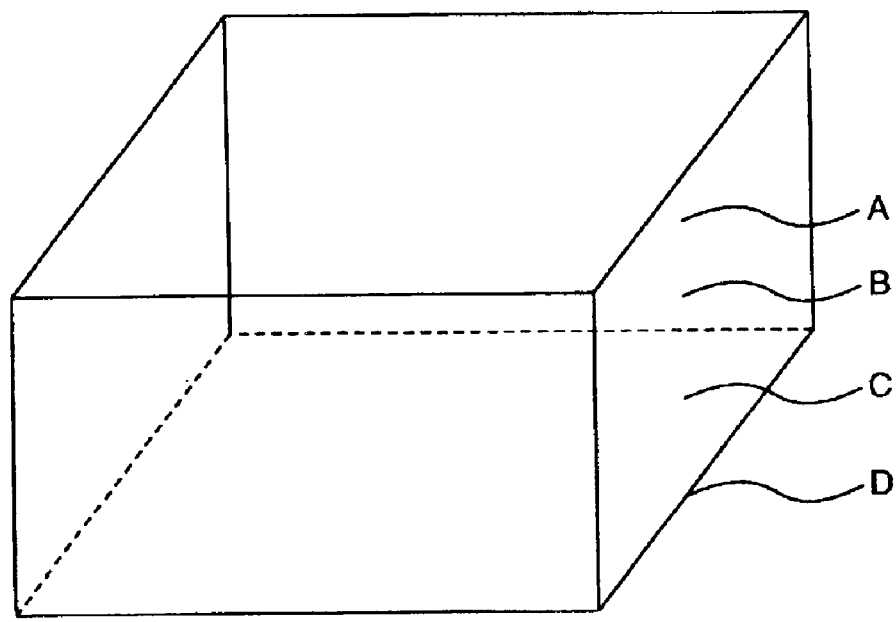
FIG. 1 shows a formed product obtained from a foamed sheet.

The present invention will be explained in detail below.

As mentioned above, the present invention is an aromatic monovinyl resin composition comprising (a) a polymer comprising an aromatic monovinyl monomer and having a weight average molecular weight of 150,000–700,000 and (b) a 3-arylbenzofuranone represented by the above formula (I), wherein amount of the 3-arylbenzofuranone is 0.006–0.5% by weight based on the weight of the polymer and residual amount of the aromatic monovinyl monomer remaining in the aromatic monovinyl resin composition is not more than 100 ppm.

As the aromatic monovinyl monomer used as a starting material for obtaining the polymer (a) comprising an aromatic monovinyl monomer, mention may be made of not only styrene alone, but also mixtures of styrene with other vinyl monomers copolymerizable with styrene. Here, examples of the other vinyl monomers copolymerizable with styrene are methyl methacrylate, methyl acrylate, butyl acrylate, ethyl methacrylate, halogen-containing vinyl monomers, α-methylstyrene, o-methylstyrene, m-methylstyrene, p-methylstyrene, etc., and one or more of them can be used. These vinyl monomers copolymerizable with styrene can be used in a proportion of generally not more than 60% by weight, preferably not more than 50% by weight based on all the monomers.

Moreover, the aromatic monovinyl polymers may contain rubber components such as polybutadiene, SBR, polyisoprene, nitrile rubber, natural rubbers, etc.

In the present invention, as a heat deterioration inhibitor, there is used one which has a structure capable of effectively trapping radicals generated in the absence of oxygen to perform stabilization, namely, a 3-arylbenzofuranone represented by the above formula (I). Amount of the heat deterioration inhibitor is 0.006–0.5% by weight, preferably 0.008–0.3% by weight, more preferably 0.01–0.2% by weight based on the weight of the polymer. If the amount of the 3-arylbenzofuranone is less than 0.006% by weight, the effect to inhibit the production of the aromatic monovinyl monomer and dimer or trimer thereof at the devolatilizing step is insufficient, and products less in the contents of them cannot be obtained. Moreover, if the amount is less than 0.006% by weight, the effect to inhibit the production of styrene monomer due to the heat decomposition of the polymer at molding is insufficient, and since it becomes very difficult to keep amount of the residual styrene monomer in the products at low level, products of satisfactory color tone cannot be obtained. This is not preferred. On the other hand, even if the 3-arylbenzofuranone is added in an amount of more than 0.5% by weight, the effect which is to be obtained corresponding to the amount added cannot be obtained.

Examples of the heat deterioration inhibitors are 5,7-di-tert-butyl-3-(2,4-dimethylphenyl)-3H-benzofuran-2-one, 5,7-di-tert-butyl-3-(2,5-dimethylphenyl)-3H-benzofuran-2-one, 5,7-di-tert-butyl-3-(3,4-dimethylphenyl)-3H-benzofuran-2-one, etc. Among them, preferred is 5,7-di-tert-butyl-3-(3,4-dimethylphenyl)-3H-benzofuran-2-one.

In the present invention, the residual amount of the aromatic monovinyl monomer is not more than 100 ppm, preferably not more than 95 ppm. When a rectangular parallelepiped container of 95 mm in opening width, 55 mm in length, 96 mm in depth and 2 mm in thickness is prepared from polystyrene and impact-resistant polystyrene by injection molding, 200 ml of warm water of 90° C. is charged in this container, and after lapse of 3 minutes, odor of this warm water is examined, the problem of odor is markedly improved and color tone of the product is also markedly improved in the case of the residual amount of the aromatic monovinyl monomer being not more than 100 ppm. On the other hand, in the case of the residual amount of the aromatic monovinyl monomer being more than 100 ppm, color tone of the product is inferior even if said 3-arylbenzofuranone is added in the desired amount, and the object cannot be attained.

In the present invention, weight average molecular weight of the aromatic monovinyl polymer is preferably 150,000–700,000. It is more preferably 180,000–500,000. If the molecular weight is less than 150,000, strength of the product is insufficient, and if it is more than 700,000, moldability conspicuously deteriorates.

In the present invention, it is preferred that the total residual amount of dimer and trimer of the aromatic monovinyl monomer is not more than 0.4% by weight, more preferably not more than 0.35% by weight. When the amount is not more than 0.4% by weight, the problem of deposition of oil onto the molded product is markedly improved in the case of injection molding, and moldability is highly improved. In this case, as above, when the amount of the aromatic monovinyl monomer is not more than 100 ppm, products of good color tone, less odor and markedly excellent moldability can be obtained.

When polystyrene was used as the aromatic monovinyl polymer and the oil deposited at the injection molding was examined, 1,3-diphenylpropane, 2,4-diphenyl-1-butene, 1,2-diphenylcyclobutane, 1-phenyltetralin, etc. were contained as the dimers, and 2,4,6-triphenyl-1-hexene, 1-phenyl-4-(1'-phenylethyl)tetralin, etc. were contained as the trimers.

The aromatic monovinyl resin composition obtained by the method of the present invention may contain usual additives, such as lubricants, antioxidants, ultraviolet absorbers, releasing agents, plasticizers, dyes, pigments, various fillers, etc., if required. Furthermore, there may also be added other polymers such as general polystyrenes, styrene-butadiene copolymer elastomers, partially or completely hydrogenated styrene-butadiene copolymer elastomers, polyphenylene ethers, etc.

The aromatic monovinyl resin composition of the present invention can be made into a foamed sheet, and this foamed sheet can be made into a formed product. In production of a foamed sheet using the aromatic monovinyl resin composition of the present invention, the influence, on the product, of the aromatic monovinyl monomer condensed in the mandrel of extruder is investigated to find that poor appearance and inferior printability are not caused, and appearance of the product is markedly improved and color tone of the product is also superior when the residual amount of the aromatic monovinyl monomer is not more than 100 ppm. On the other hand, when the amount exceeds 100 ppm, poor appearance and inferior printability are seen.

Moreover, when the total amount of the residual dimer and trimer of the aromatic monovinyl monomer is not more than 0.4% by weight, the product has little unevenness in thickness, and appearance of the foamed sheet and the formed product obtained from the sheet is also improved. The surface of the formed product is observed under magnification by a light microscope to find that cell collapse hardly occurs and the surface is smooth.

The aromatic monovinyl resin composition of the present invention can also be made into a non-foamed sheet, and this non-foamed sheet can be made into a formed product. As above, die lines are not formed in production of the non-foamed sheet, and appearance of the product is markedly improved when the residual amount of the aromatic monovinyl monomer is not more than 100 ppm. Further, color tone of the product is also good.

When the total amount of the dimer and trimer of the aromatic monovinyl monomer is not more than 0.4% by weight, deposition of foreign matters is visually examined to find no deposition of the foreign matters, and appearance of the product is markedly improved. On the other hand, if the amount exceeds 0.4% by weight, the foreign matters deposited on the dice part are transferred to the sheet to damage the appearance of the product.

Next, the method for producing the aromatic monovinyl resin composition of the present invention will be explained.

Aromatic monovinyl polymers, for example, polystyrene produced in industrial scale is mostly produced by radical polymerization, and, in this case, styrene monomers and dimers or trimers thereof are produced much in devolatilization of unreacted materials and/or solvent at the devolatilizing step or due to the heat decomposition of the polymer just after devolatilization, and the resulting products contain them in large amounts. Furthermore, when molded products are obtained using these resins by injection molding, blow molding, extrusion molding, etc., amounts of the styrene monomer, and dimers and trimers thereof further increase owing to the thermal history at molding.

Amount of the monomer remaining in industrially produced polystyrene is about 200–400 ppm, and it is very difficult to obtain a polystyrene containing the monomer in an amount of, for instance, not more than 100 ppm. Hitherto, in many cases, polystyrene is obtained by polymerization with heat initiation radicals and/or polymerization initiator radicals produced by the reaction of styrene monomer. In this case, amounts of the dimer and trimer of the styrene monomer can be reduced by increasing the proportion of the polymerization initiator radicals, but they are again produced due to the heat decomposition at the devolatilizing step, and thus there is the limit in reduction of the amounts of the dimer and the trimer.

The method of production according to the present invention is a method for obtaining a product which is very small in the amount of the aromatic monovinyl monomer, and besides in the amounts of the dimer and the trimer thereof by adding a 3-arylbenzofuranone represented by the formula (I) at the polymerization step or devolatilization step or after the polymerization step and before the devolatilization step.

The method of polymerization of aromatic monovinyl monomer at the polymerization step in the present invention has no special limitation, and, as radical polymerization method, can be used conventional methods, for example, bulk polymerization method, suspension polymerization method, multi-stage polymerization method such as bulk-suspension polymerization method, and emulsion polymerization method. Furthermore, anionic polymerization method or ionic polymerization method using metallocene catalysts, and the like can also be used.

Here, the polymerization method of the present invention will be explained referring to the bulk polymerization method which is a radical polymerization method.

As the polymerization initiators used in the method of the present invention, mention may be made of organic peroxides, for example, peroxy ketals such as 2,2-bis(t-butylperoxy)butane, 2,2-bis(t-butylperoxy)-octane, 1,1-bis(t-butylperoxy)-3,3,5-trimethyl-cyclohexane, 1,1-bis(t-butylperoxy)cyclohexane, n-butyl-4,4-bis(t-butylperoxy) valerate, etc., dialkyl peroxides such as di-t-butyl peroxide, t-butylcumyl peroxide, dicumyl peroxide, α,α'-bis(t-butylperoxyisopropyl)benzene, 2,5-dimethyl-2,5-di(t-butylperoxy)hexane, 2,5-dimethyl-2,5-di(t-butylperoxy) hexyne-3, etc., diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-toluoyl peroxide, etc., peroxydicarbonates such as diisopropyl peroxydicarbonate, di-2-ethylhexyl peroxydicarbonate, di-n-propyl peroxydicarbonate, dimyristyl peroxydicarbonate, di-n-ethoxyethyl peroxydicarbonate, dimethoxyisopropyl peroxydicarbonate, di-(3-methyl-3-methoxybutyl) peroxydicarbonate, etc., peroxy esters such as t-butyl peroxyacetate, t-butyl peroxyisobutyrate, t-butyl peroxypivalate, t-butyl peroxyneodecanoate, cumyl peroxyneodecanoate, t-butyl peroxy-2-ethylhexanoate, t-butyl peroxy-3,3,5-trimethylhexanoate, t-butyl peroxylaurate, t-butyl peroxybenzoate, di-t-butyl diperoxyisophthlate, 2,5-dimethyl-2,5-di(benzoylperoxy) hexane, t-butylperoxy isopropyl carbonate, etc., ketone peroxides such as acetylacetone peroxide, methyl ethyl ketone peroxide, cyclohexanone peroxide, 3,3,5-trimethylcyclohexanone peroxide, methylcyclohexanone peroxide, etc., hydroperoxides such as t-butyl hydroperoxide, cumene hydroperoxide, diisopropylperbenzene hydroperoxide, p-menthane hydroperoxide, 2,5-dimethylhexane-2,5-dihydroperoxide, 1,1,3,3-tetramethylbutyl hydroperoxide, etc., and the like.

Furthermore, there may also be used 2,2'-azobisisobutyronitrile, 2,2'-azobis(2-methylbutyronitrile), 1,1'-azobis(1-cyclohexanecarbonitrile), etc. which are azo initiators.

These organic peroxides or azo initiators may be used each alone or in combination of two or more.

As for the polymerization conditions, bulk polymerization may be carried out with starting the polymerization at 20–180° C. depending on the decomposition temperature of the organic peroxides used as the polymerization initiators. To this bulk polymerization system can be optionally added chain transfer agents, solvents, heat stabilizers such as general antioxidants, mineral oils, silicone oils, etc.

Examples of the chain transfer agents are α-methylstyrene linear dimers, mercaptanes, terpenes and halogen compounds such as n-dodecyl mercaptan, t-dodecyl mercaptan, 1-phenyl-2-fluorene, dipentene, chloroform, etc., turpentines such as turpenolene, etc., and the like. Amount of the chain transfer agents used has no special limitation, and generally it is about 0.005–0.1% by weight based on the monomers.

Examples of the solvents which are optionally used are aromatic hydrocarbons such as toluene, xylene, ethylbenzene, etc., dialkyl ketones such as methyl ethyl ketone, etc. These may be used each alone or in combination of two or more. Moreover, other solvents such as aliphatic hydrocarbons, etc. can be mixed with the aromatic hydrocarbons in such a range as not reducing the solubility of polymerization products. These solvents are used preferably in the range of not exceeding 25% by weight based on the monomers. If amount of the solvent exceeds 25% by weight, polymerization rate conspicuously decreases and impact strength of the resulting resins greatly decreases. Furthermore, a large energy is required for recovery of the solvents to cause deterioration of economical efficiency. The solvent may be added after the polymerization has proceeded and viscosity has become relatively high, or it may be added before polymerization. When the solvent is added in a proportion of 5–20% by weight before polymerization, the quality becomes uniform, and this is preferred from the point of control of polymerization temperature.

Examples of general stabilizers are hindered phenol type antioxidants such as octadecyl-3-(3,5-tertiary-butyl-4-hydroxyphenyl) propionate, 4,6-bis(octylthiomethyl)-o-cresol, etc., phosphorus-based processing heat stabilizers such as tris(2,4-di-tertiary-butylphenyl) phosphite, etc., and the like. These stabilizers may be used each alone or in combination of two or more. The time of addition is not particularly limited, and they may be added at either polymerization step or devolatilization step. Moreover, the stabilizers can be mixed with the product by a mechanical apparatus such as an extruder, Banbury mixer, or the like.

The apparatuses used in the polymerization step have no limitation and may be optionally selected in accordance with the polymerization method of the aromatic monovinyl monomers. For example, in the case of bulk polymerization, a polymerization apparatus comprising a first reactor, a second reactor and a third reactor can be used, and in the case of anionic polymerization, a polymerization apparatus such as an autoclave or the like can be used.

In the present invention, the devolatilization step has also no special limitation. In the case of carrying out the polymerization of aromatic monovinyl monomer by bulk polymerization, the polymerization is allowed to proceed until amount of unreacted aromatic monovinyl monomer finally reaches preferably not more than 50% by weight, more preferably not more than 40% by weight, and then devolatilization treatment is carried out by known method to remove volatile matters such as the aromatic monovinyl monomer and the like.

This devolatilization step is for removing unreacted materials and/or solvents from the reaction product after polymerization reaction, and for the devolatilization treatment, there can be used ordinary devolatilizing apparatuses such as flash drum, two-shaft devolatilizing machine, thin film evaporator, extruder, etc. Temperature for the devolatilization treatment is usually about 190–280° C. Pressure for the devolatilization treatment is usually 1–100 torr, preferably 1–50 torr, more preferably 1–10 torr. As devolatilizing method, preferred is to carry out the removal, for example, by reducing the pressure under heating or by passing through an extruder or the like designed for the purpose of removing volatile matters.

In the present invention, it is preferred that a 3-arylbenzofuranone represented by the above formula (I) (heat deterioration inhibitor) is added at the polymerization step or the devolatilization step. That is, in this case, the 3-arylbenzofuranone is added to a reactor used for the polymerization reaction or an extruder.

More preferably, 3-arylbenzofuranone is added after completion (preferably just after completion) of the polymerization step and before the devolatilization step, and in this case the 3-arylbenzofuranone is added at the outlet of the reactor used for the polymerization reaction.

For inhibition of heat decomposition of the polymer, 3-arylbenzofuranone may further be added to the resulting product using a mechanical apparatus such as an extruder, a Banbury mixer or the like.

After 3-arylbenzofuranone (heat deterioration inhibitor) is added to a polymerization solution obtained at the polymerization step, it is preferred to mix them uniformly. This is because if 3-arylbenzofuranone is added to a reactor of inferior mixability or a polymerization line provided with no mixing means, dispersion of 3-arylbenzofuranone which is a heat deterioration inhibitor is insufficient, and although there is an effect to inhibit production of aromatic monovinyl monomer and dimers or trimers thereof at the devolatilization step, the effect is lowered and this is not preferred.

In order to uniformly mix the polymerization solution obtained at the polymerization step with 3-arylbenzofuranone (heat deterioration inhibitor), preferably, for example, a mixing apparatus is provided in addition to the polymerization apparatus and the devolatilization apparatus. The construction of the mixing apparatus has no special limitation, and any mixing apparatuses can be used as far as the polymerization solution obtained at the polymerization step can be uniformly mixed with 3-arylbenzofuranone. For example, there may be used complete mixing type mixers, column type mixers, etc. Specifically, the mixing apparatus can be provided behind the polymerization apparatus (e.g., the third reactor).

In the method of the present invention, in case 3-arylbenzofuranone is added at the polymerization step, it is desirable to add the 3-arylbenzofuranone represented by the above formula (I) at the time when polymerization rate of the aromatic monovinyl monomer reaches not less than 50%, especially not less than 60%. The polymerization rate here means a ratio (%) of the weight of the polymerized polymer when weight of the starting monomer is assumed to be 100. If it is added at the beginning of polymerization, radicals at the polymerization reaction are trapped and this is not so preferred.

Furthermore, in case 3-arylbenzofuranone is added at the polymerization step, it is preferred to add it when the polymerization temperature at the polymerization step is not higher than 160° C. If the heat deterioration inhibitor is added after the polymerization temperature exceeds 160° C., radicals at the polymerization reaction are rapidly trapped and this is not so preferred.

When the polymerization is carried out by bulk-suspension polymerization, a partially polymerized product is dispersed in an aqueous medium with stirring using a suspension stabilizer such as calcium tertiary phosphate, polyvinyl alcohol or the like or using the suspension stabilizer in combination with a surface active agent, and the reaction is completed by suspension polymerization. The resulting slurry containing suspension polymer particles is dehydrated, washed and then dried. Thereafter, unreacted materials in the dried suspension polymer particles are devolatilized, for example, by an extruder at the devolatilization step, and the polymer particles are pelletized. In this case, 3-arylbenzofuranone represented by the formula (I) is preferably added before the devolatilization step.

Furthermore, when anionic polymerization is carried out, the monomer is dissolved in an inert solvent, and polymerization is carried out using as a polymerization initiator an organic alkyl metal compound such as n-butyl lithium, sec-butyl lithium, t-butyl lithium, or the like. After termination of the polymerization, active terminals of the polymer are deactivated with a compound containing active hydrogen, such as methanol or the like to complete the polymerization. Thereafter, at the devolatilization step, unreacted materials and/or solvents are devolatilized from the reaction product after the polymerization reaction, for example, by a flash drum, a two-shaft devolatilizing machine, a thin film evaporator, an extruder, etc. and the product is pelletized. In this case, the 3-arylbenzofuranone represented by the formula (I) is added preferably before the devolatilization step.

EXAMPLES

The present invention will be explained in detail by the following examples and comparative examples, which should not be construed as limiting the invention in any manner.

Preparation Example 1

Preparation of 5,7-di-tert-butyl-3-(3,4-dimethylphenyl)-3H-benzofuran-2-one

A mixture of 212.5 g (1.00 mole) of 2,4-di-tert-butylphenol (97%), 163.0 g (1.10 mole) of 50% aqueous glyoxylic acid and 0.5 g (2.6 millimoles) of p-toluenesulfonic acid monohydrate was added to 300 ml of 1,2-dichloroethane, followed by refluxing for 3.5 hours on a water separator in nitrogen. The resulting reaction mixture was concentrated, and the residue was taken in 800 ml of hexane and washed with water three times. The aqueous layer was further extracted with 300 ml of hexane, and the extract was combined with the organic layer, followed by drying with magnesium sulfate and then concentrating to obtain 260 g of a viscous compound.

500 ml of o-xylene was added to the resulting compound and 40 g of Fulcat 22B (trademark for sheet-like silicate manufactured by Laporte Adsorbents Co., Ltd.) was added thereto, followed by refluxing for 1.5 hours on a water separator. Then, Fulcat 22B was removed by filtration and excess o-xylene was distilled off. The residue was crystallized from 400 ml of methanol to obtain 175.5 g of 5,7-di-tert-butyl-3-(3,4-dimethylphenyl)-3H-benzofuran-2-one.

Preparation Example 2

Preparation of 5,7-di-tert-butyl-3-(2,4-dimethylphenyl)-3H-benzofuran-2-one

A mixture of 212.5 g (1.00 mole) of 2,4-di-tert-butylphenol (97%), 163.0 g (1.10 mole) of 50% aqueous glyoxylic acid and 0.5 g (2.6 millimoles) of p-toluenesulfonic acid monohydrate was added to 300 ml of 1,2-dichloroethane, followed by refluxing for 3.5 hours on a water separator in nitrogen. The resulting reaction mixture was concentrated, and the residue was taken in 800 ml of hexane and washed with water three times. The aqueous layer was further extracted with 300 ml of hexane, and the extract was combined with the organic layer, followed by drying with magnesium sulfate and then concentrating to obtain 262 g of a viscous compound.

500 ml of m-xylene was added to the resulting compound and 40 g of Fulcat 22B (trademark for sheet-like silicate manufactured by Laporte Adsorbents Co., Ltd.) was added thereto, followed by refluxing for 1.5 hours on a water separator. Then, Fulcat 22B was removed by filtration and excess m-xylene was distilled off. The residue was crystallized from 400 ml of methanol to obtain 242 g of 5,7-di-tert-butyl-3-(2,4-dimethylphenyl)-3H-benzofuran-2-one.

Methods for analysis of the resin compositions and molded products in examples and comparative examples are as follows.

(1) Measurement of Weight Average Molecular Weight:

Preparation of sample: About 1000 ppm of the resin composition was dissolved in tetrahydrofuran.

Conditions of measurement:

Device: Shodex 21 manufactured by Showa Denko K. K. (gel permeation chromatography) Column: Sample: KF-806L 2 columns Reference: KF-800RL 2 columns Temperature: 40° C.

Carrier: THF 1 ml/min

Detector: RI, UV: 254 nm

Calibration curve: Monodisperse PS manufactured by Toso Co., Ltd.

Data Processing: Sic-480

(2) Measurement of Melt Flow Rate:

This was measured in accordance with ISO R1133 (conditions: 200° C., load 5 kgf).

(3) Measurement of Residual Amount of Styrene Monomer in Molded Product:

Preparation of sample: 1 g of the resin composition was dissolved in 25 ml of dimethylformamide. Only when the polymer was syndiotactic, 0.1 g of the resin composition was dissolved in dichlorobenzene.

Conditions of measurement:

Method of detection: FID

Device: GC14B manufactured by Shimadzu Construction Co., Ltd.

Column: CHROMAPACK CP WAX 52CB 100 m, film thickness 2 μm, 0.52 mmφ

Column temperature: 110° C.-10 min→15° C./min→130° C.-2 min

Inlet temperature: 150° C.

Detector temperature: 150° C.

Carrier gas: Helium (4) Measurement of the Amount of 3-arylbenzofuranone in Molded Product:

Preparation of sample: 1 g of the molded product was dissolved in methyl ethyl ketone.

Conditions of measurement:

Method of detection: FID

Device: GC17Apf manufactured by Shimadzu Construction Co., Ltd.

Column: DB-1 (100% dimethylpolysiloxane)

30 m, film thickness 0.1 μm, 0.25 mmφ

Column temperature: 100° C.-2 min→5° C./min→260° C.-5 min

Inlet temperature: 200° C.

Detector temperature: 200° C.

Carrier gas: Nitrogen (5) Measurement of Amounts of Dimer and Trimer of Styrene Monomer:

The amounts were measured in the same manner as in the above (4).

As to the relations between color tone of molded product, odor of molded product or deposition of oil on mold and amount of 3-arylbenzofuranone, amount of styrene monomer or amounts of dimer and trimer of the styrene monomer, the results obtained in Examples 1–10 and Comparative Examples 1–8 are shown in Table 1.

Methods for evaluation of the resin compositions in Examples 1–10 and Comparative Examples 1–8 are as follows.

(1) Method of Judgement on Odor:

A rectangular parallelepiped container of 95 mm in opening width, 55 mm in length, 96 mm in depth and 2 mm in thickness was prepared from the resin composition by injection molding, 200 ml of warm water of 90° C. was charged in this container, and after lapse of 3 minutes, odor of this warm water was examined.

(2) Method of Judgement on Color Tone of Product:

This was visually judged on the molded product used in the judgement on color tone in (1).

(3) Method of Examination on Deposition of Oil onto Mold:

In carrying out injection molding using a strip-shaped mold of 150×50×2.5 mm, short shots were conducted at a filling of 3.0 seconds. After termination of 70 shots, the injection molding was suspended for 15 minutes and the mold was cooled, and the surface of the mold corresponding to the tip portion of the molded product was observed to examine the state of deposition of oil. Thereafter, while the state of deposition of oil onto the mold was similarly examined every 70 shots, the molding was repeated until 980 shots, and the number of shots when oil began to deposit onto the mold was obtained.

Example 1

0.05 Part by weight of a polymerization initiator (1,1-bis (t-butylperoxy)-3,3,5-trimethylcyclohexane) was dissolved in 90 parts by weight of styrene and 10 parts by weight of ethylbenzene, and the solution was fed continuously and successively to a polymerization apparatus consisting of a first reactor, a second reactor and a third reactor having a capacity of 1 liter each at a rate of 0.5 liter/hour. Just after termination of the above polymerization step, namely, at an outlet of the third reactor, 5,7-di-tert-butyl-3-(3,4-dimethylphenyl)-3H-benzofuran-2-one dissolved in ethylbenzene was added to the polymer obtained in the third reactor (weight average molecular weight=260,000) in an amount of 0.15% by weight based on the polymer. Then, the polymer and 5,7-di-tert-butyl-3-(3,4-dimethylphenyl)-3H-benzofuran-2-one were uniformly mixed by a complete mixing type mixer (capacity: 150 ml) provided behind the third reactor, and the mixture was transferred to a devolatilization apparatus consisting of two single-screw extruders connected in series, and at this devolatilization step volatile matters were successively removed and the mixture was pelletized.

The conditions of polymerization reaction at the polymerization step were as follows: The polymerization temperature was 105–110° C. and the number of revolution of stirrer was 150 rpm in the first reactor; the polymerization temperature was 115–125° C. and the number of revolution of stirrer was 50 rpm in the second reactor; and the polymerization temperature was 130–150° C. and the number of revolution of stirrer was 20 rpm in the third reactor. The polymerization rates at the outlets of the respective reactors were 35% at the outlet of the first reactor, 65% at the outlet of the second reactor, and 90% at the outlet of the third reactor. At the devolatilization step, the former single-screw extruder had a temperature of 190–200° C. and a degree of vacuum of 30 torr, and the latter single-screw extruder had a temperature of 220–240° C. and a degree of vacuum of 5 torr.

Injection molded products for judgement on odor were produced using the resulting pellets under the following two different conditions. The first condition is as follows: A molded product was obtained by usual continuous molding (product obtained without retention step). Another condition is as follows: Molding was once stopped and the resin was retained for 30 minutes in the cylinder, and then the molding was resumed, the resin obtained by the first two shots was abandoned, and the retained resin of the third shot was taken as a molded product (product obtained with a retention step of 30 minutes). Molding temperatures of the respective zones of the injection molding machine were 250° C., 250° C., 230° C., and 210° C. Furthermore, the state of deposition of oil onto the mold at the time of injection molding was examined.

Residual amount of the styrene monomer, total residual amount of the dimer and the trimer of the styrene monomer, results of judgement on the odor, color tone of the molded product by visual judgement, and state of deposition of oil onto the mold are shown in Table 1.

Example 2

Pellets and a molded product were produced in the same manner as in Example 1, except that the amount of 5,7-di-tert-butyl-3-(3,4-dimethylphenyl)-3H-benzofuran-2-one was 0.05% by weight, and they were evaluated on physical properties, etc. The results are shown in Table 1.

Example 3

Pellets and a molded product were produced in the same manner as in Example 1, except that the amount of 5,7-di-tert-butyl-3-(3,4-dimethylphenyl)-3H-benzofuran-2-one was 0.02% by weight, and they were evaluated on physical properties, etc. The results are shown in Table 1.

Example 4

Pellets and a molded product were produced in the same manner as in Example 1, except that 5,7-di-tert-butyl-3-(3, 4-dimethylphenyl)-3H-benzofuran-2-one was added at the position between the former extruder and the latter extruder of the single-screw extruder at the devolatilization step and the amount was 0.05% by weight, and they were evaluated on physical properties, etc. The results are shown in Table 1.

Example 5

Pellets and a molded product were produced in the same manner as in Example 1, except that 5,7-di-tert-butyl-3-(2, 4-dimethylphenyl)-3H-benzofuran-2-one obtained in Preparation Example 2 was added in place of 5,7-di-tert-butyl-3-(3,4-dimethylphenyl)-3H-benzofuran-2-one and the amount was 0.05% by weight, and they were evaluated on physical properties, etc. The results are shown in Table 1.

Example 6

Pellets and a molded product were produced in the same manner as in Example 1, except that 85 parts by weight of styrene and 5 parts by weight of polybutadiene (Diene 35 manufactured by Asahi Kasei K. K.) were used in place of 90 parts by weight of styrene, and they were evaluated on physical properties, etc. The results are shown in Table 1.

Example 7

Pellets and a molded product were produced in the same manner as in Example 1, except that the amount of 5,7-di-tert-butyl-3-(3,4-dimethylphenyl)-3H-benzofuran-2-one was 0.02% by weight in Example 6, and they were evaluated on physical properties, etc. The results are shown in Table 1.

Example 8

Pellets and a molded product were produced in the same manner as in Example 1, except that the amount of 5,7-di-tert-butyl-3-(3,4-dimethylphenyl)-3H-benzofuran-2-one was 0.01% by weight, and they were evaluated on physical properties, etc. The results are shown in Table 1.

Example 9

60 Kilograms of dehydrated cyclohexane and 10 kg of dehydrated styrene were charged in an autoclave equipped with a stirrer and subjected to replacement with dry nitrogen, and 30% by weight of a cyclohexane solution containing 6 g of n-butyl lithium was added thereto and polymerization reaction was carried out at a initial reaction temperature of 50° C. with vigorous stirring. After lapse of 5 minutes, the internal temperature of the reactor rose to 85° C. The reaction was carried out for 20 minutes, and the polymerization rate was measured by a gas chromatography to obtain 99.8%. Then, 1 kg of methanol was added to the polymerization solution in the reactor, followed by stirring for 30 minutes. Then, to the resulting polymer was added 0.01% by weight of 5,7-di-tert-butyl-3-(3,4-dimethylphenyl)-3H-benzofuran-2-one at the inlet of a 20 mm single-screw extruder, followed by devolatilization and pelletization by this single-screw extruder at an extruder temperature of 210–230° C. and a degree of vacuum of 15 torr. Production of a molded product using the pellets and evaluation of the product were carried out in the same manner as in Example 1. The results are shown in Table 1.

Example 10

A reactor of KRC manufactured by Kurimoto Iron Works, Ltd. (internal volume: 8.6 liters; diameter of blade: 100 mm; cylinder effective length: 1000 mm; the number of paddles: 44 sets; clearance between inner wall of cylinder and paddle: 1 mm) was used with controlling the internal temperature to 80° C. and the number of revolution to 200 rpm. Continuous polymerization was carried out for 5 hours with feeding to this reactor styrene at a rate of 1 liter/hour, and, besides, methylaluminoxane at a rate of 75 millimoles/hour and pentamethylcyclopentadienyltitanium trimethoxide at a rate of 0.15 millimole/hour as catalysts. Powders discharged from the outlet of the reactor were immersed in methanol in which 1% by weight of sodium hydroxide was dissolved, and were washed. Thereafter, to the resulting polymer was added 0.01% by weight of 5,7-di-tert-butyl-3-(3,4-dimethylphenyl)-3H-benzofuran-2-one at the inlet of the 20 mm single-screw extruder, followed by drying at 180° C. under 10 torr for 1 hour by a dryer. The polymer before adding the additives thereto was 97% in syndiotacticity at racemic pentad by 13C-NMR.

The polymer was subjected to devolatilization and pelletization by the above single-screw extruder at an extruder temperature of 270–290° C. and a degree of vacuum of 20 torr.

Injection molded products for judgement on odor were produced using the resulting pellets under two different conditions. The first condition is as follows: A molded product was obtained by usual continuous molding (without retention step). Another condition is as follows: Molding was once stopped and the resin was retained for 30 minutes in the cylinder, and then the molding was resumed, the resin obtained by the first two shots was abandoned, and the retained resin of the third shot was taken as a molded product (product obtained with retention for 30 minutes). Molding temperatures of the respective zones of the injection molding machine were 290° C., 290° C., 280° C., and 270° C. Furthermore, the state of deposition of oil onto the mold at the time of injection molding was examined. Residual amount of the styrene monomer, results of judgement on the odor, color tone of the molded product by visual judgement and state of deposition of oil onto the mold are shown in Table 1.

Comparative Example 1

Pellets and a molded product were produced in the same manner as in Example 1, except that 5,7-di-tert-butyl-3-(3,4-dimethylphenyl)-3H-benzofuran-2-one was not added, and they were evaluated on physical properties, etc. The results are shown in Table 1.

Comparative Example 2

Pellets and a molded product were produced in the same manner as in Example 1, except that the amount of 5,7-di-tert-butyl-3-(3,4-dimethylphenyl)-3H-benzofuran-2-one was 0.005% by weight, and they were evaluated on physical properties, etc. The results are shown in Table 1.

Comparative Example 3

Pellets and a molded product were produced in the same manner as in Example 1, except that SUMILIZER GS (a trademark for phenolic heat deterioration inhibitor manufactured by Sumitomo Chemical Co., Ltd.; chemical name: 2-[1-(2-hydroxy-3,5-di-tert-pentylphenyl)ethyl]-4,6-di-tert-pentylphenyl acrylate) was used in place of 5,7-di-tert-butyl-3-(3,4-dimethylphenyl)-3H-benzofuran-2-one, and the amount was 0.05% by weight, and they were evaluated on physical properties, etc. The results are shown in Table 1.

Comparative Example 4

Pellets and a molded product were produced in the same manner as in Example 1, except that SUMILIZER GS (a trademark for phenolic heat deterioration inhibitor manufactured by Sumitomo Chemical Co., Ltd.) was used in place of 5,7-di-tert-butyl-3-(3,4-dimethylphenyl)-3H-benzofuran-2-one, and the amount was 0.3% by weight, and they were evaluated on physical properties, etc. The results are shown in Table 1.

Comparative Example 5

Pellets and a molded product were produced in the same manner as in Example 1, except that the amount of 5,7-di-tert-butyl-3-(3,4-dimethylphenyl)-3H-benzofuran-2-one was 0.005% by weight and 5,7-di-tert-butyl-3-(3,4-dimethylphenyl)-3H-benzofuran-2-one was added at the position between the former extruder and the latter extruder of the single-screw extruder at the devolatilization step and, furthermore, water was added in an amount of 1% by weight to the polymer, and they were evaluated on physical properties, etc. The results are shown in Table 1.

Comparative Example 6

Pellets and a molded product were produced in the same manner as in Example 2, except that the degree of vacuum of the latter single-screw extruder was 20 torr, and they were evaluated on physical properties, etc. The results are shown in Table 1.

Comparative Example 7

Pellets and a molded product were produced in the same manner as in Example 9, except that the degree of vacuum in drying of the polymer was 30 torr, and they were evaluated on physical properties, etc. The results are shown in Table 1.

Comparative Example 8

Pellets and a molded product were produced in the same manner as in Example 10, except that the degree of vacuum in drying of the polymer was 28 torr, and they were evaluated on physical properties, etc. The results are shown in Table 1.

TABLE 1

| | Deterioration inhibitor | | Pellet discharged from polymerization apparatus | | Injection molded product (No retention) | | Injection molded product (Retention for 30 minutes) | | | The number of shots before deposition of oil |
|---|---|---|---|---|---|---|---|---|---|---|
| | | | Residual amount of styrene | Residual amount of low molecular components | Visual judgement on color | Judgement | Residual amount of styrene | Visual judgement on color | Judgement | |
| | Kind *1 | Amount (wt %) | monomer (ppm) | *2 (wt %) | tone *3 | ordor *4 | monomer (ppm) | tone *3 | odor *4 | |
| Example 1 | ABF1 | 0.15 | 43 | 0.11 | o | o | 44 | o | o | 700 |
| Example 2 | ABF1 | 0.05 | 57 | 0.14 | o | o | 59 | o | o | 630 |
| Example 3 | ABF1 | 0.02 | 68 | 0.21 | o | o | 74 | o | o | 560 |
| Example 4 | ABF1 | 0.05 | 59 | 0.17 | o | o | 61 | o | o | 630 |
| Example 5 | ABF2 | 0.05 | 59 | 0.15 | o | o | 61 | o | o | 630 |
| Example 6 | ABF1 | 0.15 | 40 | 0.09 | o | o | 41 | o | o | 700 |
| Example 7 | ABF1 | 0.02 | 64 | 0.18 | o | o | 69 | o | o | 630 |
| Example 8 | ABF1 | 0.01 | 80 | 0.32 | o | o | 95 | o | o | 490 |
| Example 9 | ABF1 | 0.01 | 85 | 0.04 | o | o | 90 | o | o | 910 |
| Example 10 | ABF1 | 0.01 | 30 | 0.01> | o | o | 85 | o | o | 980 |
| Comparative Example 1 | — | — | 165 | 0.50 | x | x | 215 | xx | x | 210 |
| Comparative Example 2 | ABF1 | 0.005 | 140 | 0.45 | x | x | 160 | x | x | 280 |
| Comparative Example 3 | GS | 0.05 | 122 | 0.29 | x | x | 140 | x | x | 490 |
| Comparative Example 4 | GS | 0.3 | 55 | 0.16 | xx | o | 70 | xx | o | 560 |
| Comparative Example 5 | ABF1 | 0.005 | 87 | 0.44 | o | o | 110 | x | x | 280 |
| Comparative Example 6 | ABF1 | 0.05 | 130 | 0.15 | x | x | 135 | x | x | 630 |
| Comparative Example 7 | ABF1 | 0.01 | 120 | 0.04 | x | x | 127 | x | x | 910 |
| Comparative Example 8 | ABF1 | 0.01 | 118 | 0.01> | x | x | 152 | x | x | 980 |

*1 ABF1 = 5,7-di-tert-butyl-3-(3,4-dimethylphenyl)-3H-benzofuran-2-one, ABF2 = 5,7-di-tert-butyl-3-(2,4-dimethylphenyl)-3H-benzofuran-2-one, GS = SUMILIZER GS
*2: Low molecular components = Total of dimer and trimer of styrene monomer
*3: Visual judgement on color tone; o Colorless, x Somewhat yellow, xx Yellow
*4: Judgement on odor; o No odor, x Ordor development It can be seen from Table 1 that molded products highly excellent in color tone can be obtained by adding 3-arylbenzofuranone represented by the formula (I) in a given amount and setting the residual amount of the styrene monomer at not more than 100 ppm. If the residual amount of the styrene monomer is larger, color tone of the resulting molded products is considerably deteriorated even when the heat deterioration inhibitor is added in the given amount. Furthermore, when they are subjected to residence test in molding machines, the resin compositions of the present invention are less in increase of the amounts of the styrene monomer and dimer or trimer thereof, and the products do not change in color tone and are very excellent in heat stability. Moreover, the resin compositions of the present invention contain the dimer and trimer in an amount of not more than 0.4% by weight in total, cause less deposition of oil to the mold, and are much superior in moldability.

Further, when the phenolic heat deterioration inhibitor (SUMILIZER GS) is used, the resulting products are considerably bad in color tone. It can be further seen that even when amount of the phenolic heat deterioration inhibitor is the same as that of 3-arylbenzofuranone of the present invention, the effect to diminish the styrene monomer and the dimer or the trimer is lower than 3-arylbenzofuranone of the present invention.

Evaluations (i) of foamed sheets produced using the resin composition of the present invention and formed products made from the sheets were conducted.

Methods of evaluation on the resins used in the following Examples 11–19 and Comparative Examples 9–11 are as follows.

(1) Method of Evaluation of the Foamed Sheets on Formability:

For determination of formability of the foamed sheets, it was examined whether formed products could be obtained from the foamed sheets by a small forming machine with changing the oven temperature to 200° C., 220° C. and 240° C. for a constant heating time.

(2) Method of Measurement of Unevenness in Thickness of the Formed Products:

In ten samples of formed products shown in FIG. 1 obtained from the foamed sheets, thickness of four positions (A, B, C, D) of the same side face was measured, and standard deviation thereof was obtained and this was taken as an indication of unevenness in thickness.

(3) Method of Judgement on Appearance of the Formed Products and Transferability in Printing:

Surface roughness of the formed products was visually examined. The transferability in printing was judged by visual examination of the transferability of letters printed.

Examples 11–19 and Comparative Examples 9–10

The resins used for producing the foamed sheets were those which were produced in Examples 1–9 and Comparative Examples 1–2 and mentioned in the column "Resins used for evaluation of foamed sheets" in Table 2.

Comparative Example 11

A resin was produced in the same manner as in Example 2, except that the polymerization initiator (1,1-bis(t-butylperoxy)-3,3,5-trimethylcyclohexane) was not added, and the polymerization temperature in the first reactor was 125–130° C., that in the second reactor was 135–145° C. and that in the third reactor was 150–165° C. (polymerization rate at the outlet of the third reactor: 90%).

deep and about 2–3 mm thick was produced by a mold adjusted to 60° C. using a small forming machine. For determination of forming width at the forming, it was tested whether production of a formed product was possible or not at the three points of oven temperature of 200° C., 220° C. and 240° C. Furthermore, measurement of unevenness in thickness and visual examination of appearance of the formed product obtained at the oven temperature of 200° C. were conducted.

Residual amount of the styrene monomer, total residual amount of the dimer and the trimer of the styrene monomer, formability of the foamed sheet, unevenness in thickness of the formed product, results of visual examination of appearance are shown in Table 2.

TABLE 2

| | Resin used for evaluation of foamed sheet | Deterioration inhibitor Kind *1 | Deterioration inhibitor Amount (wt %) | Pellet discharged from polymerization apparatus Residual amount of styrene monomer (ppm) | Pellet discharged from polymerization apparatus Residual amount of low molecular components *2 (wt %) | Melt flow (g/10 min) | Foamed sheet Residual amount of styrene monomer (ppm) | Foamed sheet Residual amount of low molecular components *2 (wt %) | Formability Forming possible: ○ Impossible: x Heating time (15 sec) Heating temperature (° C.) 200 | 220 | 240 | Formed product Standard deviation of unevenness in thickness (mm) *3 | Appearance *4 |
|---|---|---|---|---|---|---|---|---|---|---|---|---|---|
| Example 11 | Example 1 | ABF1 | 0.15 | 43 | 0.11 | 1.5 | 42 | 0.11 | ○ | ○ | ○ | 0.1 | ○ |
| Example 12 | Example 2 | ABF1 | 0.05 | 57 | 0.14 | 1.7 | 57 | 0.13 | ○ | ○ | ○ | 0.1 | ○ |
| Example 13 | Example 3 | ABF1 | 0.02 | 68 | 0.21 | 1.7 | 70 | 0.22 | ○ | ○ | ○ | 0.1 | ○ |
| Example 14 | Example 4 | ABF1 | 0.05 | 59 | 0.17 | 1.7 | 58 | 0.16 | ○ | ○ | ○ | 0.1 | ○ |
| Example 15 | Example 5 | ABF2 | 0.05 | 59 | 0.15 | 1.7 | 59 | 0.15 | ○ | ○ | ○ | 0.1 | ○ |
| Example 16 | Example 6 | ABF1 | 0.15 | 40 | 0.09 | 1.5 | 41 | 0.09 | ○ | ○ | ○ | 0.15 | ○ |
| Example 17 | Example 7 | ABF1 | 0.02 | 64 | 0.18 | 1.7 | 67 | 0.19 | ○ | ○ | ○ | 0.15 | ○ |
| Example 18 | Example 8 | ABF1 | 0.01 | 80 | 0.32 | 1.8 | 89 | 0.35 | ○ | ○ | ○ | 0.15 | ○ |
| Example 19 | Example 9 | ABF1 | 0.01 | 85 | 0.04 | 1.7 | 89 | 0.07 | ○ | ○ | ○ | 0.1 | ○ |
| Comparative Example 9 | Comparative Example 1 | — | — | 165 | 0.50 | 1.9 | 213 | 0.61 | ○ | ○ | x | 0.35 | x |
| Comparative Example 10 | Comparative Example 2 | ABF1 | 0.005 | 140 | 0.45 | 1.8 | 162 | 0.53 | ○ | ○ | x | 0.3 | x |
| Comparative Example 11 | — | ABF1 | 0.05 | 65 | 0.80 | 1.8 | 66 | 0.81 | ○ | x | x | 0.5 | x |

*1: ABF1 = 5,7-di-tert-butyl-3-(3,4-dimethylphenyl)-3H-benzofuran-2-one
ABF2 = 5,7-di-tert-butyl-3-(2,4-dimethylphenyl)-3H-benzofuran-2-one
*2: Low molecular components = Total of dimer and trimer of styrene monomer
*3: Unevenness in thickness = Standard deviation of thickness of side face (2–3 mm) of formed product
*4: Appearance (surface gloss and gloss unevenness) ○: Good x: Bad <Method for Producing a Formed Product Using a Foamed Sheet of the Aromatic Monovinyl Resin Composition>

Using a 30 mm extrusion foaming machine provided with a T-die of 30 mm in width, a foamed sheet of about 8 times was obtained from 100 parts by weight of the aromatic monovinyl resin composition to which 1 part by weight of a foaming nucleator and 3 parts by weight of a foaming agent were added. Temperature of resin melting zone was adjusted to 180–230° C., that of rotary cooler was adjusted to 150–160° C. and that of T-die was adjusted to 120–130° C. The foaming nucleator used was MISTRON VAPOR manufactured by Japan Mistron Co., Ltd. and the foaming agent used was a mixture of 65% by weight of n-butane and 35% by weight of i-butane.

The resulting foamed sheet was cured for 1 week and heated for 15 seconds at a given oven temperature, and then a box-shaped formed product of 100 mm square, 50 mm Evaluations (ii) of foamed sheets produced using the resin composition of the present invention and formed products produced from the sheets were conducted.

Example 20

A resin composition was produced under nearly the same production conditions as in Example 1, except that the reaction apparatus used was 10 times in size, and the amount of 5,7-di-tert-butyl-3-(3,4-dimethylphenyl)-3H-benzofuran-2-one was 0.05% by weight. Using the resulting pellets, a foamed sheet and a formed product were produced by the following method.

<Method for Producing a Formed Product Using a Foamed Sheet of the Aromatic Monovinyl Resin Composition>

To 100 parts by weight of the aromatic monovinyl resin composition were added 0.5 part by weight of talc as a foaming nucleator and 0.3 part by weight of zinc stearate as a dispersing aid, followed by well stirring and mixing them by mixer and then feeding the mixture to a hopper of a 65 mm single-screw extruder having an L/D of 33. Then, the mixture was melt kneaded at the former stage of the screw of the extruder at 235° C., and a mixture of 65% by weight of n-butane and 35% by weight of i-butane was poured from a foaming agent pouring hole provided at the intermediate stage of the extruder so that the amount of the mixture was 2.5% by weight based on the total amount of extrudate.

Then, the kneaded product was cooled to 160° C. at the latter stage of the screw of the extruder and subjected to foaming extrusion from a ring die in a tubular form. The resulting tubular foamed sheet was cooled in a mandrel of the extruder and then one face thereof was cut open by a cutter to obtain a foamed sheet. The foamed sheet for visual examination and for producing a formed product was taken after continuous operation of the extruder for 1 hour and was cured for 1 week. After visual examination, this foamed sheet was heated for 10 seconds in an oven of 200° C., and then a box-shaped formed product of 100 mm square and 40 mm deep was produced by a mold adjusted to 60° C. using a small forming machine. After visual examination, letters were printed on the formed product and transferability was evaluated.

Residual amount of the styrene monomer, total residual amount of the dimer and the trimer of the styrene monomer, appearance of the foamed sheet, appearance of the formed product and printability are shown in Table 3.

Example 21

A resin composition and a formed product were produced in the same manner as in Example 20, except that the degree of vacuum in the latter stage of the single-screw extruder at the devolatilization step was 10 torr, and they were evaluated on physical properties, etc. The results are shown in Table 3.

Comparative Example 12

A resin composition and a formed product were produced in the same manner as in Example 20, except that the degree of vacuum in the latter stage of the single-screw extruder at the devolatilization step was 40 torr, and they were evaluated on physical properties, etc. The results are shown in Table 3.

TABLE 3

|  | Deterioration inhibitor | | Pellet discharged from polymerization apparatus | | | Foamed sheet | | Formed product | |
|---|---|---|---|---|---|---|---|---|---|
|  |  |  | Residual amount of styrene | Residual amount of low molecular components | Melt flow rate | Residual amount of styrene | Residual amount of low molecular components | Appearance | Transferability in printing |
|  | Kind *1 | Amount (wt %) | monomer (ppm) | *2 (wt %) | (g/10 min) | monomer (ppm) | *2 (wt %) | *3 | *4 |
| Example 20 | ABF1 | 0.05 | 58 | 0.14 | 1.8 | 63 | 0.16 | o | o |
| Example 21 | ABF1 | 0.05 | 80 | 0.14 | 1.7 | 87 | 0.17 | o | o |
| Comparative Example 12 | ABF1 | 0.05 | 400 | 0.16 | 1.7 | 412 | 0.18 | x | x |

*1: ABF1 = 5,7-di-tert-butyl-3-(3,4-dimethylphenyl)-3H-benzofuran-2-one
*2: Low molecular components = Total of dimer and trimer of styrene monomer
*3: Appearance (surface gloss and gloss unevenness) o: Good x: Bad
*4: Transferability in printing
Degree of Transferability of letters o: Good x: Bad It can be seen from Table 2 and Table 3 that when the residual amount of the styrene monomer is not more than 100 ppm and the total residual amount of the dimer and the trimer of the styrene monomer is not more than 0.4% by weight, foamed sheets excellent in formability can be obtained and formed products less in unevenness of thickness and very excellent in appearance and printability can be obtained. Furthermore, the resin composition of the present invention is very excellent in heat stability in production of foamed sheets.

Moreover, non-foamed sheets produced using the resin composition of the present invention and formed products made from the non-foamed sheets were evaluated.

Methods for evaluation of the resins used in the following Examples 22–30 and Comparative Examples 13–17 are as follows.

(1) Methods for Judgement on Die Lines and Foreign Matters at the Dice Part:

Presence of die lines was visually examined by observing the surface of the resin sheet with a magnifying lens of five magnifications. The foreign matters at dice part was visually examined.

(2) Method for Judgement on Appearance:

Foreign matters and irregularity of the surface were visually examined with a magnifying lens of five magnifications.

Examples 22–30 and Comparative Examples 13–17

The resins used for producing the resin sheets were those which were produced in Examples 1–9 and Comparative Examples 1, 2, 5, 12 and 11 and mentioned in the column "Resins used for evaluation of resin sheets" in Table 4. Methods for producing the resin sheet and the formed product are shown below.

<Method for Producing a Formed Product Using a Sheet of the Aromatic Monovinyl Resin Composition>

Using a 30 mm extruder provided with a T-die of 40 mm in width, a sheet of 300 mm in width and 1 mm in thickness was taken off by rolls, and continuous operation was carried out for 3 hours. Then, ten sheets of 300 mm in length were collected, and, simultaneously, presence or absence of deposition of foreign matters at the resin outlet of T-die was examined. Temperature of resin melting zone was adjusted to 200–250° C., and that of T-die was adjusted to 220–240° C. The collected sheets were heated to 130–140° C., and then box-shaped formed products of 100 mm square and 50 mm deep were produced by vacuum forming using a small pressure forming machine.

Residual amount of the styrene monomer, total residual amount of the dimer and the trimer of the styrene monomer, die lines of the resin sheets, presence or absence of foreign matters at the dice part, and appearance of the formed product are shown in Table 4.

provided behind the outlet of the third reactor was not provided, and evaluation on physical properties, etc. was conducted. The results are shown in Table 5.

Example 32

In Example 2, the position of addition of 5,7-di-tert-butyl-3-(3,4-dimethylphenyl)-3H-benzofuran-2-one was changed from the outlet of the third reactor to the position of ⅔ from the top of the third reactor. At the position of the addition, polymerization temperature was 150° C., and the polymerization rate was 81% at the position of the addition. Amount of the poured additive was adjusted so as to be the same as in Example 2. Pellets and a molded product were produced in the same manner as in Example 2, except for the condi-

TABLE 4

| | Resin used for evaluation | Deterioration inhibitor | | Pellet discharged from polymerization apparatus | | | Resin sheet | | | | |
|---|---|---|---|---|---|---|---|---|---|---|---|
| | | | | Residual amount of styrene | Residual amount of low molecular components | Melt flow | Residual amount of styrene | Residual amount of low molecular components | Die lines | Foreign matters at dice | Appearance of molded product |
| | of foamed sheet | Kind *1 | Amount (wt %) | monomer (ppm) | *2 (wt %) | (g/10 min) | monomer (ppm) | *2 (wt %) | *3 | *3 | *4 |
| Example 22 | Example 1 | ABF1 | 0.15 | 43 | 0.11 | 1.5 | 42 | 0.11 | ○ | ○ | ○ |
| Example 23 | Example 2 | ABF1 | 0.05 | 57 | 0.14 | 1.7 | 57 | 0.13 | ○ | ○ | ○ |
| Example 24 | Example 3 | ABF1 | 0.02 | 68 | 0.21 | 1.7 | 70 | 0.22 | ○ | ○ | ○ |
| Example 25 | Example 4 | ABF1 | 0.05 | 59 | 0.17 | 1.7 | 58 | 0.16 | ○ | ○ | ○ |
| Example 26 | Example 5 | ABF2 | 0.05 | 59 | 0.15 | 1.7 | 58 | 0.15 | ○ | ○ | ○ |
| Example 27 | Example 6 | ABF1 | 0.15 | 40 | 0.09 | 1.5 | 41 | 0.09 | ○ | ○ | ○ |
| Example 28 | Example 7 | ABF1 | 0.02 | 64 | 0.18 | 1.7 | 67 | 0.19 | ○ | ○ | ○ |
| Example 29 | Example 8 | ABF1 | 0.01 | 80 | 0.32 | 1.8 | 89 | 0.35 | ○ | ○ | ○ |
| Example 30 | Example 9 | ABF1 | 0.01 | 85 | 0.04 | 1.7 | 89 | 0.07 | ○ | ○ | ○ |
| Comparative Example 13 | Comparative Example 1 | — | — | 165 | 0.50 | 1.9 | 213 | 0.61 | x | x | x |
| Comparative Example 14 | Comparative Example 2 | ABF1 | 0.005 | 140 | 0.45 | 1.8 | 162 | 0.53 | x | x | x |
| Comparative Example 15 | Comparative Example 5 | ABF1 | 0.005 | 87 | 0.44 | 1.8 | 120 | 0.52 | x | x | x |
| Comparative Example 16 | Comparative Example 12 | ABF1 | 0.05 | 400 | 0.16 | 1.7 | 511 | 0.15 | x | ○ | x |
| Comparative Example 17 | Comparative Example 11 | ABF1 | 0.05 | 65 | 0.80 | 1.8 | 65 | 0.81 | ○ | x | x |

*1: ABF1 = 5,7-di-tert-butyl-3-(3,4-dimethylphenyl)-3H-benzofuran-2-one
ABF2 = 5,7-di-tert-butyl-3-(2,4-dimethylphenyl)-3H-benzofuran-2-one
*2: Low molecular components = Total of dimer and trimer of styrene monomer
*3: Die lines and foreign matters at dice part ○: No x: Present
*4: Appearance (foreign matters, surface irregularities, etc.) ○: Good x: Bad It can be seen from Table 4 that when the residual amount of the styrene monomer is not more than 100 ppm and the total residual amount of the dimer and the trimer of the styrene monomer is not more than 0.4% by weight, formed products having few die lines, few foreign matters and excellent appearance can be obtained. Furthermore, the resin composition of the present invention is very excellent in heat stability in production of resin sheets.

Finally, Examples 1–8, Comparative Examples 1–2, and the following Examples 31–33 and Comparative Example 18 were compared on the method for production of the resin composition of the present invention, and the results are shown in Table 5.

Example 31

Pellets and a molded product were produced in the same manner as in Example 2, except that the mixing apparatus tions referred to above, and evaluation of physical properties, etc. was conducted. The results are shown in Table 5.

Example 33

In Example 32, the polymerization temperature at the position of addition of 5,7-di-tert-butyl-3-(3,4-dimethylphenyl)-3H-benzofuran-2-one was changed to 160° C. The polymerization rate at the position of addition was 86%. Amount of the poured additive was adjusted so as to be the same as in Example 32. Pellets and a molded product were produced in the same manner as in Example 32, except for the conditions referred to above, and evaluation of physical properties, etc. was conducted. The results are shown in Table 5.

Comparative Example 18

The procedure of Example 2 was repeated, except that 5,7-di-tert-butyl-3-(3,4-dimethylphenyl)-3H-benzofuran-2- one was added to the polymerization starting material at the inlet of the first reactor. The results are shown in Table 5.

TABLE 5

| | | Heat deterioration inhibitor | | | | | Pellet discharged from polymerization apparatus | |
|---|---|---|---|---|---|---|---|---|
| | Polymerization method | Kind *1 | Amount (wt %) | Position of addition | Mixing apparatus | Temperature of polymerization solution at the position of addition (° C.) | Degree of vacuum of former/ latter extruders (torr) | Residual amount of styrene monomer (ppm) | Residual amount of low molecular components *3 (wt %) |
| Example 1 | Continuous bulk polymerization | ABF1 | 0.15 | Outlet of the third reactor | Used | 150 | 30/5 | 43 | 0.11 |
| Example 2 | Continuous bulk polymerization | ABF1 | 0.05 | Outlet of the third reactor | Used | 150 | 30/5 | 57 | 0.14 |
| Example 3 | Continuous bulk polymerization | ABF1 | 0.02 | Outlet of the third reactor | Used | 150 | 30/5 | 68 | 0.21 |
| Example 4 | Continuous bulk polymerization | ABF1 | 0.05 | Between extruders | Used | 150 | 30/5 | 59 | 0.17 |
| Example 5 | Continuous bulk polymerization | ABF2 | 0.05 | Outlet of the third reactor | Used | 150 | 30/5 | 59 | 0.15 |
| Example 6 | Continuous bulk polymerization | ABF1 | 0.15 | Outlet of the third reactor | Used | 150 | 30/5 | 40 | 0.09 |
| Example 7 | Continuous bulk polymerization | ABF1 | 0.02 | Outlet of the third reactor | Used | 150 | 30/5 | 64 | 0.18 |
| Example 8 | Continuous bulk polymerization | ABF1 | 0.01 | Outlet of the third reactor | Used | 150 | 30/5 | 80 | 0.32 |
| Example 9 | Anionic polymerization | ABF1 | 0.01 | Inlet of extruder | — | — | — | 85 | 0.04 |
| Example 10 | Ionic- polymerization *2 | ABF1 | 0.01 | Inlet of extruder | — | — | — | 30 | 0.01> |
| Example 31 | Continuous bulk polymerization | ABF1 | 0.05 | Outlet of the third reactor | Not used | 150 | 30/5 | 65 | 0.19 |
| Example 32 | Continuous bulk polymerization | ABF1 | 0.05 | The third reactor | Used | 150 | 30/5 | 62 | 0.16 |
| Example 33 | Continuous bulk polymerization | ABF1 | 0.05 | The third reactor | Used | 160 | 30/5 | 85 | 0.28 |
| Comparative Example 1 | Continuous bulk polymerization | — | — | — | — | — | 30/5 | 165 | 0.50 |
| Comparative Example 2 | Continuous bulk polymerization | ABF1 | 0.005 | Outlet of the third reactor | Used | 150 | 30/5 | 140 | 0.45 |
| Comparative Example 18 | Continuous bulk polymerization | ABF1 | 0.05 | Inlet of the first reactor | Used | — | 30/5 | 167 | 0.52 |

*1: ABF1 = 5,7-di-tert-butyl-3-(3,4-dimethylphenyl)-3H-benzofuran-2-one
ABF2 = 5,7-di-tert-butyl-3-(2,4-dimethylphenyl)-3H-benzofuran-2-one
*2: Ionic polymerization using metallocene catalyst
*3: Low molecular components = Total of dimer and trimer of styrene monomer It can be seen from Table 5 that residual amount of styrene monomer and total residual amount of dimer and trimer of the styrene monomer can be markedly reduced by adding the specific amount of 3-arylbenzofuranone of the present invention at the third reactor in the polymerization step, at the outlet of the third reactor which is just after the polymerization step (before devolatilization step) or at the position between the former single-screw extruder and the latter single-screw extruder in the devolatilization step. Furthermore, amounts of the above-mentioned low molecular weight components can be further reduced by uniformly mixing the polymerization solution obtained at the polymerization step with the heat deterioration inhibitor using a mixing equipment after the addition of the heat deterioration inhibitor. Moreover, in the case of adding the heat deterioration inhibitor at the polymerization step, amounts of the low molecular weight components can be further reduced by adding the heat deterioration inhibitor at the position of higher polymerization rate and low polymerization temperature.

Industrial Applicability

As mentioned above, the aromatic monovinyl resin composition of the present invention is excellent in moldability and heat stability at the molding and can be made into products satisfactory in color tone and less in development of odor. In addition, the composition of the present invention can be suitably used as extruded sheets (foamed or non-foamed) and molded products made by injection molding, blow molding and the like, and there can be obtained particularly suitable products for packaging materials and containers which directly contact with foods, etc. Furthermore, the aromatic monovinyl resin composition of the present invention can be widely employed for uses such as toys, miscellaneous goods, daily necessaries, electrical parts, various industrial parts, etc., and, thus, it plays an important part in the industrial world.

What is claimed is:

1. An aromatic monovinyl resin composition comprising (a) a polymer comprising an aromatic monovinyl monomer and having a weight average molecular weight of 150,000–700,000 and (b) at least one 3-arylbenzofuranone selected from the group consisting of 5,7-di-tert-butyl-3-(2,4-dimethylphenyl)-3H-benzofuran-2-one, 5,7-di-tert-butyl-3-(2,5-dimethylphenyl)-3H-benzofuran-2-one or 5,7-di-tert-butyl-3-(3,4-dimethylphenyl)-3H-benzofuran-2-one, wherein amount of the 3-arylbenzofuranone is 0.006–0.5% by weight based on the weight of the polymer and residual amount of the aromatic monovinyl monomer in the aromatic monovinyl resin composition is not more than 100 ppm.

2. An aromatic monovinyl resin composition according to claim 1, wherein the total residual amount of a dimer and a trimer of the aromatic monovinyl monomer is not more than 0.4% by weight.

3. An aromatic monovinyl resin composition according to claim 1, wherein an aromatic monovinyl resin or an aromatic monovinyl resin composition comprises a polystyrene, an impact resistant polystyrene or a styrene-(meta)acrylate ester copolymer.

4. An aromatic monovinyl resin composition according to claim 3, wherein said (meta)acrylate ester comprises methyl methacrylate.

5. A foamed sheet comprising the aromatic monovinyl resin composition according to any one of claim 1, 2, 3 or 4.

6. A non-foamed sheet comprising the aromatic monovinyl resin composition according to any one of claim 1, 2, 3 or 4.

7. A formed product comprising the foamed sheet according to claim 5.

8. A formed product comprising the non-foamed sheet according to claim 6.

9. A method for producing the aromatic monovinyl resin composition according to claim 1, wherein said at least one 3-arylbenzofuranone is added when polymerization rate reaches 50% or more at the polymerization step in which the aromatic monovinyl monomer is polymerized.

10. A method for producing the aromatic monovinyl resin composition of claim 1, wherein said at least one 3-arylbenzofuranone is added at a devolatilization step in which an unreacted material and/or a solvent are removed from a polymerization solution obtained at the polymerization step.

11. A method for producing the aromatic monovinyl resin composition of claim 1, wherein said at least one 3-arylbenzofuranone is added after termination of the polymerization step and before the devolatilization step.

12. A method for producing the aromatic monovinyl resin composition according to any one of claims 9–11, wherein the devolatilization is carried out until the total residual amount of a dimer and a trimer of the aromatic monovinyl monomer reaches not more than 0.4% by weight at the devolatilization step.

13. A method for producing the aromatic monovinyl resin composition according to any one of claims 9–11, wherein after the 3-arylbenzofuranone is added to the polymerization solution, these are uniformly mixed.

14. A method for producing the aromatic monovinyl resin composition according to any one of claims 9–11, wherein the aromatic monovinyl monomer is polymerized by radical polymerization method, anionic polymerization method or ionic polymerization method using a polymerization initiator at the polymerization step.

15. A method for producing the aromatic monovinyl resin composition according to claim 9, wherein said at least one 3-arylbenzofuranone is added at a polymerization temperature of 160° or lower.

* * * * *